United States Patent
Oh et al.

(10) Patent No.: US 9,944,054 B2
(45) Date of Patent: Apr. 17, 2018

(54) HEAT-SHRINKABLE FILM FOR LABEL WITH LOW SPECIFIC GRAVITY AND METHOD FOR PREPARING THE SAME

(71) Applicant: DONG IL CHEMICAL INC., LTD., Chungcheongnam-do (KR)

(72) Inventors: Won Seok Oh, Gyeonggi-do (KR); Yeong Taek Oh, Seoul (KR)

(73) Assignee: Dic Co., Ltd., Chungcheongnam-do (KR)

( * ) Notice: Subject to any disclaimer, the term of this patent is extended or adjusted under 35 U.S.C. 154(b) by 114 days.

(21) Appl. No.: 14/785,467

(22) PCT Filed: Nov. 28, 2013

(86) PCT No.: PCT/KR2013/010894
§ 371 (c)(1),
(2) Date: Oct. 19, 2015

(87) PCT Pub. No.: WO2014/175527
PCT Pub. Date: Oct. 30, 2014

(65) Prior Publication Data
US 2016/0082708 A1 Mar. 24, 2016

(30) Foreign Application Priority Data

Apr. 25, 2013 (KR) .................. 10-2013-0046137
Nov. 19, 2013 (KR) .................. 10-2013-0140462

(51) Int. Cl.
*B32B 27/30* (2006.01)
*B32B 5/20* (2006.01)
(Continued)

(52) U.S. Cl.
CPC ........ *B32B 27/302* (2013.01); *B29C 47/0021* (2013.01); *B29C 47/0042* (2013.01);
(Continued)

(58) Field of Classification Search
None
See application file for complete search history.

(56) References Cited

U.S. PATENT DOCUMENTS

2007/0026175 A1* 2/2007 Toya ............... C08J 9/0061
428/36.5

FOREIGN PATENT DOCUMENTS

JP 07-032525 A 2/1995
JP 2000-007806 A 1/2000
(Continued)

OTHER PUBLICATIONS

Oh, et al. (WO 2011/002148 A1); (Jan. 6, 2011) (Google Patents machine translation to English).*
(Continued)

*Primary Examiner* — David Sample
*Assistant Examiner* — Donald M Flores, Jr.
(74) *Attorney, Agent, or Firm* — Fay Sharpe LLP

(57) ABSTRACT

A heat-shrinkable label film includes a foamed layer having polystyrene as a principal component, and a pair of non-foamed layers adhesively melted to either side of the foamed layer, wherein the foamed layer and the pair of the non-foamed layers are coextruded to provide a low specific gravity less than 1.0. The film is prepared by coextruding to form the several layers completing a non-drawn film; and drawing the non-drawn film in a transverse direction (TD) at a drawing ratio of 3.5 to 5.5. The foamed ratio of the foamed layer is in the range of 5 to 20%. The thickness of the foamed layer is 60 to 90% of the total thickness of the film; and the thickness of each non-foamed layer is 5 to 20% of the total thickness of the film. The heat-shrinkable label film has a thickness of 30 to 60 μm.

5 Claims, 3 Drawing Sheets

(51) Int. Cl.
  *B32B 7/12*     (2006.01)
  *B29C 55/02*    (2006.01)
  *B29C 47/06*    (2006.01)
  *B29C 55/08*    (2006.01)
  *B29C 47/00*    (2006.01)
  *G09F 3/06*     (2006.01)
  *B32B 27/06*    (2006.01)
  *B32B 27/32*    (2006.01)
  *B29K 25/00*    (2006.01)
  *B29K 105/02*    (2006.01)
  *B29K 105/00*    (2006.01)
  *B29K 105/04*    (2006.01)
  *B29L 7/00*     (2006.01)
  *B29L 31/00*    (2006.01)

(52) U.S. Cl.
  CPC .......... B29C 47/065 (2013.01); B29C 55/023 (2013.01); B29C 55/08 (2013.01); B32B 7/12 (2013.01); B32B 27/065 (2013.01); B32B 27/32 (2013.01); G09F 3/06 (2013.01); *B29C 47/0057* (2013.01); *B29K 2025/04* (2013.01); *B29K 2025/06* (2013.01); *B29K 2105/0032* (2013.01); *B29K 2105/02* (2013.01); *B29K 2105/04* (2013.01); *B29K 2995/0097* (2013.01); *B29L 2007/002* (2013.01); *B29L 2031/744* (2013.01); *B32B 5/20* (2013.01); *B32B 2250/03* (2013.01); *B32B 2250/246* (2013.01); *B32B 2266/025* (2013.01); *B32B 2266/0228* (2013.01); *B32B 2307/306* (2013.01); *B32B 2307/412* (2013.01); *B32B 2307/54* (2013.01); *B32B 2307/5825* (2013.01); *B32B 2307/72* (2013.01); *B32B 2307/736* (2013.01); *B32B 2307/75* (2013.01); *B32B 2519/00* (2013.01)

(56) References Cited

FOREIGN PATENT DOCUMENTS

| | | | |
|---|---|---|---|
| JP | 2000007806 A | * 1/2000 | .............. B29C 61/06 |
| KR | 10-2006-0041181 A | 5/2006 | |
| KR | 10-0741935 | 7/2007 | |
| KR | 10-0926716 B1 | 11/2009 | |
| KR | 10-1156607 B1 | 6/2012 | |
| KR | 10-2013-0104465 A | 9/2013 | |
| WO | WO 2011-002148 A2 | 1/2011 | |
| WO | WO 2011002148 A2 | * 1/2011 | .......... B29C 47/0021 |

OTHER PUBLICATIONS

Jun, et al. (JP 2000-007806 A); (Jan. 1, 2000) (JPP machine translation to English).*
International Search Report of International Application No. PCT/KR2013/010894 dated Mar. 6, 2014, 4 pages.

* cited by examiner

[Fig. 1]
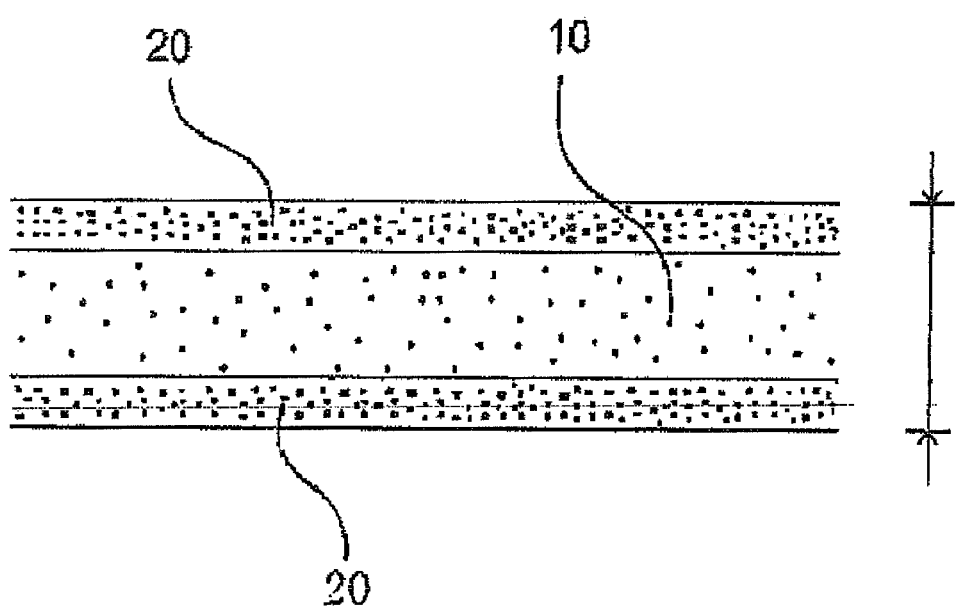

[Fig. 2a]
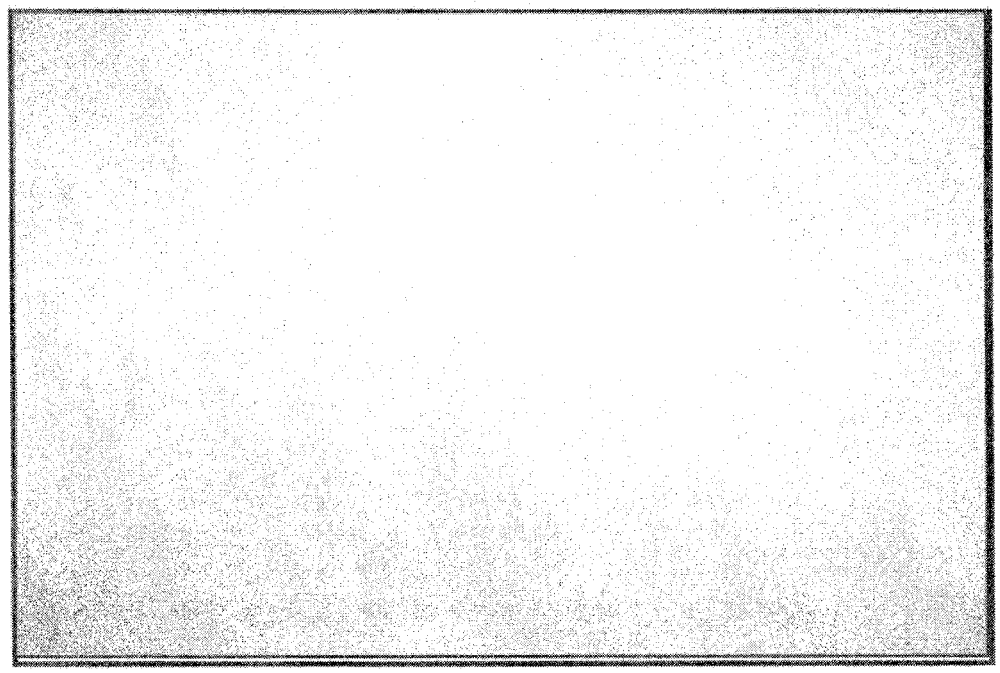
[Fig. 2b]
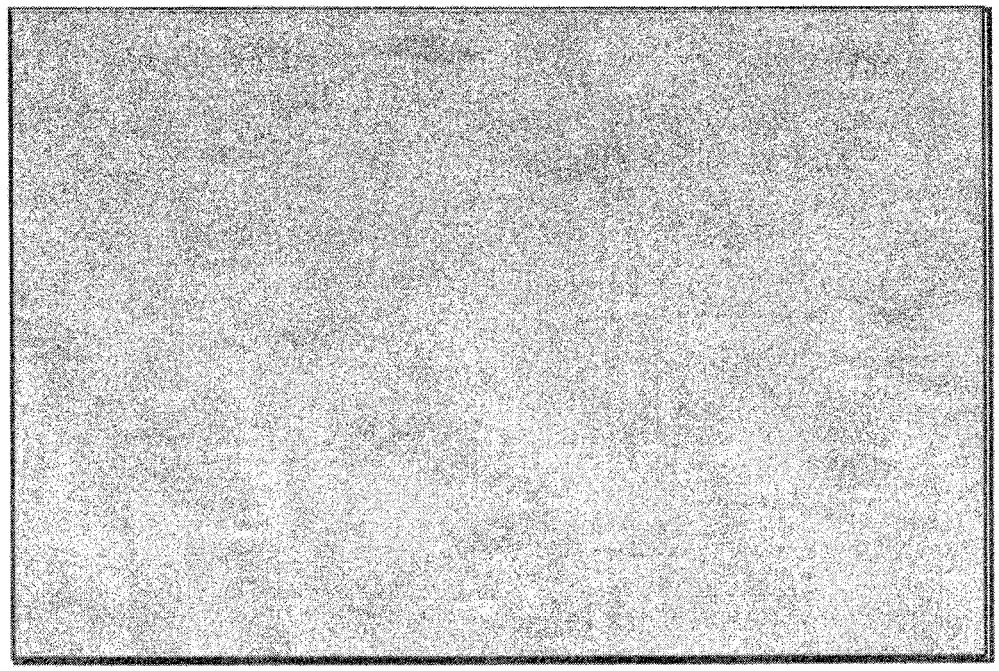

[Fig. 2c]
[Fig. 2d]
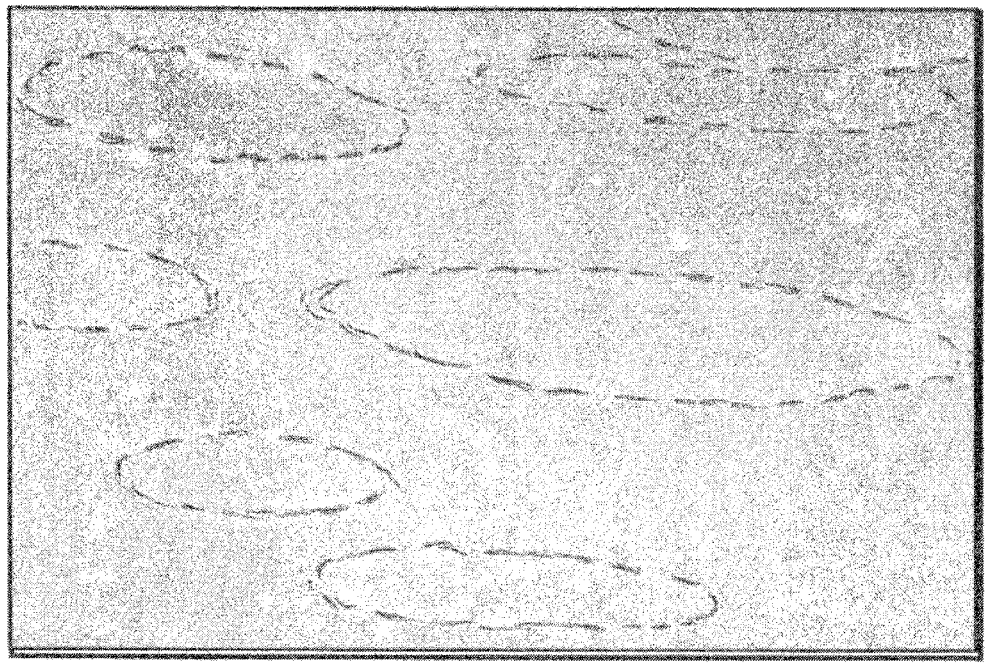

HEAT-SHRINKABLE FILM FOR LABEL WITH LOW SPECIFIC GRAVITY AND METHOD FOR PREPARING THE SAME

FIELD OF THE INVENTION

The present invention relates to a heat-shrinkable film used to form a label on the outer circumference of any kind of container, such as synthetic resin container, glass bottle, aluminum can, or the like. More particularly, the present invention relates to a heat-shrinkable film having a low specific gravity to be suitable as a label film for all kinds of containers and easily separable with water.

BACKGROUND OF THE INVENTION

Heat-shrinkable film is used to provide a label wrapping around the outer circumference of any kind of container (hereinafter, referred to as "container"), such as synthetic resin containers including polyester (PET) bottles, glass bottles, aluminum cans, or the like. In other words, a given printing is applied on the heat-shrinkable label film, which is then centrally jointed (also called as "tubed" or "seamed") in the cylindrical shape and put on a container. Hot air is externally applied to the heat-shrinkable label film on the container, as a result of which the heat-shrinkable label film is shrunk and adhered closely to the outer circumference of the container.

Such a heat-shrinkable film that is shrunk by heat to wrap the outer circumference of a container needs to meet some requirements of different properties in consideration of the label forming process, product quality, appearance, and so forth. These properties include heat resistance, printability, gloss, transparency, adhesiveness, shrinkability, fast workability, beautiful appearance, stability in distribution, and the like. The heat-shrinkable label film can be used as a label film only if it satisfies all the requirements of these properties.

Among the known synthetic resin films, the PVC film is most suitable as a heat-shrinkable label film. The PVC film is currently in wide use as a heat-shrinkable label film, because its properties, including heat resistance, printability, gloss, transparency, adhesiveness, drawing properties, etc., are suitable to label films. However, the PVC film gives off endocrine-disrupting chemicals during its disposal process after use and thus contributes to the problem concerning environmental contamination. For this reason, South Korea and Taiwan imposes legal limitations against the use of PVC film as label film, and other developed countries are applying legal limitations or put a self-regulating system to ban the use of the PVC label film.

There have been developed some alternatives to the PVC label film: PET film and PS film. These alternative films are free from the risk of causing environmental contamination as produced by PVC film, and they are easy to collect as well as recycle. But, there still remain some problems with the PET film when used as a label film.

The PET film has good properties in terms of heat resistance, printability and adhesiveness. However, it has a specific gravity of about 1.35 which increases production cost and tends to shrink too much during thermal shrinkage. Such excessive shrinkage does not affect glass bottles or aluminum cans but makes synthetic resin containers dented or deformed. Nevertheless, an advantage of the PET film is that it has such a good heat resistance so it can be used for containers, for example such as containing fruit juice, in the high-temperature pasteurization environment normally at 98° C.

Also, the PET film is good in cold shrinkage, light-weighted with a specific gravity of about 1.05, and free from risk of excessive shrinkage. Due to its good cold shrinkage, the PET film can be used as a label film for containers to contain dairy products, such as milk, yogurt, etc. The low specific gravity enables the PET film to contribute to decrease of production costs. Without excessive shrinkage, the PET film can maintain its beautiful appearance after a heat shrinkage. On the other hand, the PS film uses an alcohol-based solvent in the place of toluene or benzene during the printing process, so it is very eco-friendly but with poor printability, creating a demand for selecting or developing an appropriate ink for good printing.

To solve the problems, the inventors of the present invention have developed a novel heat-shrinkable label film to have patents acquired as Korean Patent Nos. 926716 and 1156607 and filed an application for patent as Korean Patent Application No. 2012-25974.

The heat-shrinkable label film as disclosed in Korean Patent No. 926716 has a three-layered structure that includes a PS-based film as an intermediate layer and a pair of PET-based films adhered to either side of the intermediate layer. The three-layered film has good properties in terms of heat resistance, printability, gloss, transparency, adhesiveness, elongation properties, etc. and is thus suitable as a label film.

The heat-shrinkable label film as specified in Korean Patent No. 1156607 has a structure that includes a PS-based film formed as an intermediate layer from a PS having a specific structural formula, and a pair of PET-based films formed from a PET having another specific structural formula, where the PET-based films are adhered to either side of the intermediate layer. The label film has low specific gravity and good cold shrinkage and undergoes no excessive shrinkage.

The heat-shrinkable label film as disclosed in Korean Patent Application No. 2012-25974 consists of a PS-based film having a specific structural formula and a PET-based film having another specific structural formula so that it does not peel off during the process of printing with five or more different colors.

These label films have been used for many kinds of container. But the label films cause the user to encounter a problem in collecting the container for recycling purpose. For the purposes of recycling, for example, the containers mostly formed from PET will necessarily need to remove the label film, which were shrunk and adhered firmly to the containers. The reason for removing the label film from the PET containers lies in the fact that the label film typically consists of a PS component which differs from PET and contains a printing in different color inks, causing contaminations when mixed with the clear PET container hus will reduce the product value of the PET containers for recycling. For these reasons, the Korean government encourages the development of label films easily removable with water in order to easily collect and dispose the label films and efficiently collect the PET containers.

When the PET container with a label film is pulverized and dipped in water for removal of the label film, the PET pieces which is light-weighted due to a specific gravity of PET about 1.35 will sink to the bottom of the water tank, while the label pieces having a specific gravity less than 1 will float on the water and thus easy to remove. In this manner, the PET pieces at the bottom of the water tank can then be easily collected and recycled. For this separation process, saline water containing salt can be used to remove the label film. In this case, however, there is a problem to wash the PET pieces to eliminate the saline water, resulting in a burden of expense and environmental problems.

The heat-shrinkage label film of the present invention is developed to solve the problems described above, contriving a label film floating on water because of its low specific gravity of less than 1. The PET container using the label film of the present invention is collected, cut into pieces in proper size with a cutter and sent to a water tank. The PET pieces will sink at the bottom of the water tank and the pieces of the label film will float on the water. The pieces of the label film are then removed and disposed, while the PET pieces are collected for recycling.

OBJECTS OF THE INVENTION

It is therefore an object of the present invention to provide a label film made to have a specific gravity of less than 1 and thus float on water.

It is another object of the present invention to provide a label film made to have a specific gravity ranging from 0.9 to less than 1 and thus float on water.

It is still another object of the present invention to provide a label film with low specific gravity that not only satisfies all the properties as a heat-shrinkable label film, such as heat resistance, printability, gloss, transparency, adhesiveness, drawing properties, fast workability, beautiful appearance, stability in distribution, etc., but also floats on water.

It is further another object of the present invention to provide a label film made to have a specific gravity less than 1 and thus easily removed with water.

It is further another object of the present invention to provide a label film using less amount of raw materials to reduce production costs and accommodates reduction to the weight ratio as required by the national policy supported on a global scale.

These and other objects of the present invention can be achieved by the present invention as described below.

SUMMARY OF THE INVENTION

In accordance with the present invention, there is provided a heat-shrinkable label film that includes a foamed layer 10 comprising polystyrene as a principal component, and a pair of non-foamed layers 20 adhesively melted to either side of the foamed layer 10, where the foamed layer 10 and a pair of the non-foamed layers 20 are layered by coextrusion to provide a low specific gravity less than 1.0.

In accordance with the present invention, there is provided a method of preparing a heat-shrinkable label film that comprises: coextruding individual materials to form a foamed intermediate layer 10 comprising polystyrene as a principal component and a pair of non-foamed layers 20 adhesively melted to either side of the foamed intermediate layer 10, completing a non-drawn film; and drawing the non-drawn film in the transverse direction (TD). In this regard, the drawing of the non-drawn film along the TD is preferably carried out at the drawing ratio of 3.5 to 5.5, most preferably about 4.5.

Preferably, the foamed ratio of the foamed layer 10 is in the range of 5 to 20%.

Preferably, the thickness of the foamed layer 10 is 60 to 90% of the total thickness of the film; and the thickness of each non-foamed layer 20 is 5 to 20% of the total thickness of the film.

Preferably, the heat-shrinkable label film of the present invention has a specific gravity of 0.9 to less than 1.

Preferably, the heat-shrinkable label film of the present invention has a thickness of 30 to 60 μm, which is not given to limit the scope of the present invention.

Hereinafter, a detailed description will be given as to the contents of the present invention with reference to the accompanying drawings.

Technical Effects

The present invention is directed to a label film made to have a specific gravity of less than 1 and thus will float on water, thereby providing a heat-shrinkable label film that not only satisfies all the properties as a heat-shrinkable label film, such as heat resistance, printability, gloss, transparency, adhesiveness, drawing properties, beautiful appearance, stability in distribution, etc., but will also float on water. Furthermore, the heat-shrinkable label film of the present invention uses less amount of raw materials to reduce production costs and accommodate the reduction policy.

BRIEF DESCRIPTION OF THE DRAWINGS

FIG. 1 is a schematic cross-sectional view of a heat-shrinkable label film having a three-layered structure according to the present invention.

FIG. 2 presents photographs showing a cross-section of the foamed layer 10 of the heat-shrinkable label film having a three-layered structure according to the present invention: (A) is a non-magnified cross-sectional picture; (B) is a microscopic picture showing a cross-section of the foamed layer 10 as taken at 200× magnification; (C) is a microscopic picture showing a cross-section of the foamed layer 10 as taken at 500× magnification; and (D) is a microscopic picture showing a cross-section of the foamed layer 10 as taken at 1,000× magnification.

DETAILED DESCRIPTION OF THE PREFERRED EMBODIMENTS

The present invention is directed to a heat-shrinkable label film used to form a label on the outer circumference of a synthetic resin container, particularly PET bottle or container, which heat-shrinkable label film is suitable as a label film for all kinds of containers and has low specific gravity to be easily separable with water. FIG. 1 is a schematic cross-sectional view of a heat-shrinkable label film having a three-layered structure according to the present invention.

The heat-shrinkable label film of the present invention may include a foamed layer 10 consisting of polystyrene as a principal component, and a pair of non-foamed layers 20 adhesively melted to either side of the foamed layer 10, where the foamed layer 10 and a pair of the non-foamed layers 20 are layered by coextrusion to provide a low specific gravity.

In the present invention, the foamed layer 10 is required to be provided as an intermediate layer, that is, positioned in the inside of the film. In other words, the pair of non-foamed layers 20 are adhesively melted to both sides of the foamed layer 10 to construct a three-layered structure. In this manner, the foamed layer 10 is positioned in the inside of the film, and the non-foamed layers 20 are on the surface layer. The reason of this lies in the fact that a given printing has to be applied on the non-foamed layers that form the surface layer. Printing on the foamed layer 10 which is foamed from polystyrene used as a principal component does not secure good print quality, because the foamed layer 10 has an uneven surface. In contrast, the surface of the non-foamed layers 20 is even, so printing can be done on the non-foamed layers 20 with good print quality.

It may be, of course, possible to construct the heat-shrinkable label film of the present invention that includes a foamed layer 10 consisting of polystyrene as a principal component, and a single non-foamed layer 20 adhesively melted to the one side of the foamed layer 10. In this case, printing is applied on the surface of the non-foamed layer. But, the three-layered film with the non-foamed layers on both surface sides is allowed to have a printing on both surface sides.

The reason that the foamed layer is formed as an intermediate layer of the film in the present invention lies in the fact that it helps reduce specific gravity of the film. In the present invention, the specific gravity of the film is preferably in the range of about 0.9 to less than 1. For this purpose, the foamed layer 10 is desirably foamed to have foamed ratio of 5 to 20%. The higher the foamed ratio is, the lower the specific gravity is. The heat-shrinkable label film which is shrunk and then adhered to the outer circumference of a container needs to have a good shrinkage rate. But, the foamed layer 10 with a foamed ratio greater than 20% has a reduction in the shrinkage rate effects and thus cannot be applied to a general container. On the other hand, the foamed layer 10 with a foamed ratio less than 5% has increased specific gravity, departing from the specific gravity range of about 0.9 to less than 1 that is required in the present invention.

Preferably, in one exemplary embodiment of the present invention, the thickness of the foamed layer 10 is 60 to 90% of the total thickness "t" of the film; and the thickness of either non-foamed layer 20 is 5 to 20% of the total thickness "t" of the film. The heat-shrinkable label film of the present invention preferably has a thickness in the range of about 30 to 60 μm, which is not given to limit the scope of the present invention.

The heat-shrinkable label film of the present invention may be prepared by a method that comprises: coextruding individual materials to form a foamed layer 10 comprising polystyrene as a principal component and a pair of non-foamed layers 20 adhesively melted to either side of the foamed layer 10, completing a non-drawn film; and drawing the non-drawn film in the transverse direction (TD).

The heat-shrinkable label film of the present invention may use polystyrene as a principal component. The foamed layer 10 is foamed in the presence of a foaming agent and layered with a pair of non-foamed layers 20 on either side by coextrusion. Such a coextrusion-based molding technique to form a three-layered film can be easily carried out by those skilled in the related art of the present invention.

The present invention may use a variety of polystyrene resins. The polystyrene resin is clear and good in processability but has low impact strength. It is therefore desirable to use polystyrene copolymerized with addition of a rubber component such as butadiene.

The foamed layer 10 according to one preferred exemplary embodiment of the present invention may include 30 to 95 wt % of a styrene-butadiene copolymer and 5 to 70 wt % of a general-purpose polystyrene. Further, the non-foamed layer 20 according to one preferred exemplary embodiment of the present invention may include 30 to 95 wt. % of a styrene-butadiene copolymer, 4.9 to 65 wt % of a general-purpose polystyrene, and 0.1 to 5 wt % of a high-impact polystyrene (HIPS).

The foaming agent used to form the foamed layer 10 is preferably used in an amount of 0.01 to 1.0 wt % with respect to the total weight of the resin. But, the used amount of the foaming agent has a direct relation with the foamed ratio and thus can be varied to an appropriate extent in consideration of the above-defined foamed ratio range of 5 to 20%. Of course, the foaming agent is not to be added to the non-foamed layers 20.

The foaming agent used in the present invention includes organic or inorganic foaming agents. Specific examples of the foaming agent commercially available may include azodicarbonamide, p,p'-oxybis(benzene sulfonyl hydrazide), p-toluene sulfonyl hydrazide, p-toluene sulfonyl acetone hydrazine, N,N'-dinitrosopentamethylene tetramine, p-toluene sulfonyl semicarbazide, 5-phenyltetrazole, sodium bicarbonate, and so forth.

The foamed layer 10 has a microscopic structure consisting of a uniform arrangement of cells containing bubbles. A uniform distribution of minute cells leads to production of the foam film with high quality. The foaming agent is required to generate gas uniformly during the extrusion process in order to provide a uniform distribution of minute cells. The foaming agent is mixed with the polystyrene resin, and the resultant mixture is heated and extruded in the melted state.

FIG. 2 presents photographs showing a cross-section of the foamed layer 10 of the heat-shrinkable label film having a three-layered structure according to the present invention: (A) is a non-magnified cross-sectional picture; (B) is a microscopic picture taken at 200× magnification; (C) is a microscopic picture taken at 500× magnification; and (D) is a microscopic picture taken at 1,000× magnification. The picture (B) with 200× magnification shows few bubble, while the pictures (C) and (D) with 500× or 1,000× magnification show that bubbles are uniformly distributed in the foam film.

The foamed layer 10 and the non-foamed layers 20 may contain a small amount of white pigment. Preferably, the white pigment may be titanium dioxide ($TiO_2$) or a known pigment consisting of titanium oxide as a principal component. The used amount of the white pigment may be in the range of about 1 to 5 wt % with respect to the total weight of the resin in the foamed layer 10.

To make the dispersion of the foaming agent easier, a dispersing agent may be used in combination with the foaming agent. The representative dispersing agent is paraffin oil. The used amount of the dispersing agent is as small as about 0.1 to 0.5 wt % with respect to the total weight of the resin in the foamed layer 10.

The non-drawn film prepared by coextrusion is drawn along the transverse direction (TD) axis to prepare a heat-shrinkable label film. Drawing the non-drawn film in the TD direction is to impose a shrinkage rate. The non-drawn film is preferably stretched in the TD direction with a drawing ratio of about 3.5 to 5.5. In general, for a non-drawn film with a width of 750 mm, the drawing is preferably carried out to elongate the film to a width of about 2,500 mm to 4,100 mm. When needed, the drawing process may be carried out by the two-step drawing method, which is specified in detail in Korean Patent No. 741935 filed by the applicant of the present invention.

The higher drawing ratio implies the higher shrinkage rate of the film under heat. It is therefore necessary to increase the shrinkage rate by raising the drawing ratio, in the case of using the film for a container of which the surface has a severe curvature. In the other way, the lower drawing ratio leads to the lower shrinkage rate of the film when heated.

Thus, for the container of which the surface has little curvature, the film can be prepared with a low drawing ratio.

In one exemplary embodiment of the present invention, a desired label film having a low specific gravity of about 0.9 to less than 1 can be prepared under the conditions that the thickness of the foamed layer 10 is about 80% of the total thickness of the film; the thickness of the single non-foamed layer 20 is about 10% of the total thickness of the film; and the foamed layer 10 has a foamed ratio of 15%. Preferably, the heat-shrinkable label film of the present invention has a thickness of about 30 to 60 μm, which is not given to limit the scope of the present invention.

The heat-shrinkable label film of the present invention is a semitransparent film because of the foamed layer 10 positioned as an intermediate layer. A white opaque film may be prepared by adding a white pigment to the foamed layer and the non-foamed layers. But, the conventional films are mostly transparent films because they have none of the foamed layer. To use such a transparent film as a label film, a desired printing is put on the surface to be adhered to the container, which surface is then coated with a white ink by printing (coating) typically three times. This not only makes the content of the container not seen through the adhered label but also allows the printing to show up clearly. However, as the heat-shrinkable label film of the present invention is a semitransparent or opaque film, a printing can be directly applied to the outer surface side of the film in the opposite way of the conventional transparent film where a printing is put on the surface side adhered to the container. A sufficient printing effect is attainable only by printing directly on the outer surface of the film and then applying a white ink once. In contrast to the conventional transparent film which needs to have a printing on the surface and then three applications of a white ink on it, the heat-shrinkable label film of the present invention only needs printing on the surface and then a single application of a white ink on it, thereby reducing the required process and production costs.

In addition, the present invention has the thickness of the foamed layer 10 in the range of 60 to 90% of the total thickness "t" of the film, so it can reduce the fuel by about 6 to 9% when the foamed ratio is 10%, or by about 12 to 18% when the foamed ratio is 20%.

Hereinafter, the heat-shrinkable label film of the present invention will be described in further detail with reference to the examples, which are given only for better understanding of the present invention and intended not to limit the scope of the present invention.

Examples 1-2

In order to form a foamed layer, styrene-butadiene copolymer (SBC), general-purpose polystyrene (GPPS), a white pigment, and a foaming agent are put in a foamed layer hopper according to the composition as given in Table 1. Also, to form a non-foamed layer, styrene-butadiene copolymer (SBC), general-purpose polystyrene (GPPS), high-impact polystyrene (HIPS), a white pigment, and a foaming agent are put in a non-foamed layer hopper according to the composition as given in Table 1. Although a single hopper is used for the non-foamed layers, it is designed to form, by extrusion, the non-foamed layers on either side of the foamed layer positioned as an intermediate layer.

As used herein, the SBC is 631M manufactured by DENKA SINGAPORE PTE LTD.; the GPPS is GPPS manufactured by DENKA SINGAPORE PTE LTD.; the HIPS is Polystyrol 576H manufactured by Korean BASF CO., LTD.; the white pigment is TSMIHC854 manufactured by HANILTOYO Co., LTD.; and the foaming agent is ES207A manufactured by Youngwha Chemical Co. in Japan.

The non-drawn film of which the width is 750 mm is drawn along the TD axis at a drawing ratio of 4.5 to a width of 3,375 mm.

A water tank test shows that the films of Examples 1 and 2 float on the water and has a specific gravity of 0.98. The films are measured in regards to the film thickness, tensile strength, elongation rate, tearing strength, static electricity, transparency, stiffness, friction coefficient, and shrinkable factor on the function of temperature. The measurement results are presented in Table 1. The measurement methods are as described below:

Tensile strength and elongation rate: AFTM D882,
Tearing strength: ASTM D1938,
Static electricity: JIS 61340,
Transparency: ASTM D1003,
Friction coefficient: ASTM D1894, and
Shrinkage rate: measured according to ASTM D1894 after dipping in a constant-temperature water tank for 10 seconds.

TABLE 1

| Composition/Physical Property | | Example 1 | | Example 2 | |
|---|---|---|---|---|---|
| | | foamed layer | non-foamed layer | foamed layer | non-foamed layer |
| SBC (kg) | | 85 | 85 | 85 | 85 |
| GPPS (kg) | | 15 | 15 | 15 | 15 |
| HIPS (kg) | | | 1 | | 1 |
| foaming agent (ES207) (kg) | | 0.85 | | 0.8 | |
| TSM1HC854 (pigment) (kg) | | 3 | 5 | 3 | 5 |
| water tank test | | ○ | | ○ | |
| TD/MD | | TD | MD | TD | MD |
| Thickness (μm) | | 50~55 | | 45~48 | |
| tensile strength (kgf/cm$^2$) | | 219.1 | 133.4 | 281.5 | 126.7 |
| elongation rate (%) | | 22.6 | 22.8 | 20.4 | 11.8 |
| tearing strength (kgf/cm) | | 472.9 | 152.8 | 415.5 | 191.9 |
| static electricity (Ω) | | $10^{13}$ | | $10^{13}$ | |
| Transparency (%) | | 90.3 | | 84.7 | |
| Stiffness (gf) | | 3.33 (50 μm) | | 2.7 (45 μm) | |
| Friction coefficient | inner | 0.21 | | 0.21 | |
| | external | 0.22 | | 0.23 | |
| Shrinkage rate (allowable | 70° C. (%) | 8 | −1 | 8 | −1 |
| | 80° C. (%) | 34 | −4 | 32 | −1 |

TABLE 1-continued

|  | Example 1 | | Example 2 | |
|---|---|---|---|---|
| Composition/Physical Property | foamed layer | non-foamed layer | foamed layer | non-foamed layer |
| error: ±3%) 90° C. (%) | 61 | −3 | 61 | 1 |
| 100° C. (%) | 72 | 2 | 71 | 2 |

Note)
In water tank test, "○" means that film floats on the water.

Examples 3-4

According to the composition as given in Table 2, Examples 1-2 was likewise performed except adding paraffin oil to disperse a dispersing agent and using powdery dispersing agent. Example 3 was performed to make the film having thickness of 45 μm, and Example 4 was performed to make the film having thickness of 50 μm.

As a result of the water tank test, the films of Example 3-4 float on the water, and the specific gravity is 0.98. The thickness of film, tensile strength, elongation rate, tearing strength, static electricity, transparency, stiffness, friction coefficient, and shrinkage rate depending on temperature are recorded in table 2.

TABLE 2

| | Example 3 45 μm | | Example 4 50 μm | |
|---|---|---|---|---|
| Composition/Physical Property | foamed layer | non-foamed layer | foamed layer | non-foamed layer |
| SBC (kg) | 85 | 85 | 85 | 85 |
| GPPS (kg) | 15 | 15 | 15 | 15 |
| HIPS (kg) | | 1 | | 1 |
| paraffin oil (kg) | 0.2 | | 0.2 | |
| powdery foaming agent (kg) | 0.15 | | 0.15 | |
| TSM1HC854(pigment) (kg) | 4 | 5 | 4 | 5 |
| water tank test | ○ | | ○ | |
| TD/MD | TD | MD | TD | MD |
| Thickness (μm) | 43~51 | | 48~53 | |
| tensile strength (kgf/cm$^2$) | 369.0 | 140.0 | 340.7 | 140.8 |
| elongation rate (%) | 47.6 | 11.3 | 43.0 | 16.9 |
| tearing strength (kgf/cm) | 447.6 | 249.0 | 579.3 | 256.9 |
| static electricity (Ω) | 10$^{13}$ | | 10$^{13}$ | |
| Transparency (%) | 83.7 | | 83.4 | |
| Stiffness (gf) | 2.37 (44~45 μm) | | 3.6 (50~51 μm) | |
| Friction coefficient inner | 0.21 | | 0.21 | |
| external | 0.21 | | 0.22 | |
| Shrinkage rate(allowable error: ±3%) 70° C. (%) | 8 | −1 | 7 | −1 |
| 80° C. (%) | 34 | −4 | 32 | −4 |
| 90° C. (%) | 59 | −4 | 59 | −4 |
| 100° C. (%) | 70 | 0 | 69 | 0 |

It is to be understood that modifications and other embodiments are intended to be included within the scope of protection of the present invention, and the appended claims will specifically limit scope of protection of the present invention.

The invention claimed is:

1. A heat-shrinkable film for label, which comprises a foamed layer comprising polystyrene as a principal component, and a pair of non-foamed layers adhesively melted to either side of the foamed layer, wherein the foamed layer and the pair of the non-foamed layers are layered by coextrusion to provide a low specific gravity less than 1.0, wherein the thickness of the foamed layer is 60 to 90% of the total thickness of the film, and the thickness of each non-foamed layer is 5 to 20% of the total thickness of the film, wherein the foamed ratio of the foamed layer is in the range of 5 to 20%, wherein the film has a thickness of 30 to 60 μm, and wherein the film has a specific gravity of greater than 0.9 to less than 1.0.

2. The heat-shrinkable film of claim 1, wherein the foamed layer comprises 30 to 95% by weight of a styrene-butadiene copolymer and 5 to 70% by weight of a general-purpose polystyrene, and the non-foamed layers comprise 30 to 95% by weight of a styrene-butadiene copolymer, 4.9 to 65% by weight of a general-purpose polystyrene, and 0.1 to 5% by weight of a high-impact polystyrene (HIPS).

3. A heat-shrinkable film for a label, which is removable by water separation from an associated container to which the label has been secured, the label comprising a foamed layer comprising polystyrene as a principal component, and a pair of non-foamed layers adhesively melted to either side of the foamed layer, wherein the foamed layer and the pair of the non-foamed layers are layered by coextrusion to provide a specific gravity of greater than 0.9 to less than 1.0, wherein the thickness of the foamed layer is 60 to 90% of the total thickness of the film, and the thickness of each non-foamed layer is 5 to 20% of the total thickness of the film, wherein the foamed ratio of the foamed layer is in the range of 5 to 20%, and wherein the film has a thickness of 30 to 60 μm.

4. The heat-shrinkable film of claim 3, wherein the foamed layer comprises 30 to 95% by weight of a styrene-butadiene copolymer and 5 to 70% by weight of a general-purpose polystyrene, and the non-foamed layers comprise 30 to 95% by weight of a styrene-butadiene copolymer, 4.9 to 65% by weight of a general-purpose polystyrene, and 0.1 to 5% by weight of a high-impact polystyrene (HIPS).

5. The heat shrinkable film of claim 3 wherein the label floats on water.

\* \* \* \* \*